United States Patent
Devine et al.

(10) Patent No.: US 7,176,739 B2
(45) Date of Patent: Feb. 13, 2007

(54) CIRCUIT TO IMPROVE DATA BUS PERFORMANCE

(75) Inventors: James Michael Devine, Blairstown, NJ (US); Mark Elliot Kostbade, Succasunna, NJ (US); Stephen Thomas Spang, Wharton, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/609,111

(22) Filed: Jun. 26, 2003

(65) Prior Publication Data

US 2004/0263232 A1    Dec. 30, 2004

(51) Int. Cl.
*H03L 5/00* (2006.01)
*H03B 1/00* (2006.01)

(52) U.S. Cl. ..................... 327/333; 327/112
(58) Field of Classification Search ............. 327/112, 327/309–310, 314, 317–322, 325, 328, 333; 326/86–87, 90–91, 30, 81, 68
See application file for complete search history.

(56) References Cited

U.S. PATENT DOCUMENTS

| | | | | | |
|---|---|---|---|---|---|
| 4,408,245 | A | * | 10/1983 | Pryor ........................ | 361/56 |
| 4,896,057 | A | * | 1/1990 | Yang et al. ................ | 326/116 |
| 5,592,108 | A | * | 1/1997 | Tsukahara .................. | 326/69 |
| 5,852,367 | A | * | 12/1998 | Boerstler et al. .......... | 326/80 |
| 5,959,473 | A | * | 9/1999 | Sakuragi ................... | 327/111 |
| 6,104,229 | A | * | 8/2000 | Lien ......................... | 327/434 |
| 6,118,302 | A | * | 9/2000 | Turner et al. .............. | 326/68 |
| 6,535,026 | B2 | * | 3/2003 | Chung et al. .............. | 327/51 |
| 6,605,975 | B2 | * | 8/2003 | Yamamoto ................ | 327/333 |

* cited by examiner

*Primary Examiner*—My-Trang Nu Ton

(57) ABSTRACT

A circuit comprising an active pull-up device coupled to a level shift circuit is coupled to a one-wire bus to allow communication devices coupled to the bus to better detect digital communication signals propagating through the bus. The level shift circuit provides a reference voltage signal that is typically above the circuit ground. Communication devices coupled to the bus are better able to detect digital communication signals propagating through the bus because such signals are raised above at least a portion of the noise signals on the bus.

12 Claims, 3 Drawing Sheets

CIRCUIT TO IMPROVE DATA BUS PERFORMANCE

BACKGROUND OF THE INVENTION

1. Field of the Invention

The present invention relates to the design of a data communication bus for electrical/electronic systems.

2. Description of the Related Art

Electronic systems such as communication systems and other system typically comprise various circuits and subsystems interconnected to form the overall system. Often there is a need to change, repair or otherwise alter the subsystems or various portions of the entire system. Additionally, there is a need to monitor and maintain an accounting of the current configuration of a system especially after it has been modified. The monitoring can be done with monitoring equipment or by using crafts person to confirm the proper operation of the system and to account for the various components of the system. When monitoring equipment is used, such equipment not only determine the current make up of the system but can detect if any one or more of the various subsystems are operating properly. The process of monitoring and determining the current make up of an electronic system is called inventory control. Many times the electronic system to be monitored is located remotely from the monitoring equipment. Therefore inventory control systems have been developed to allow the various subsystems to report their current status to monitoring equipment. The various subsystems can be, for example, printed circuit boards, circuit packs, ASICs (Application Specific Integrated Circuit) and other electrical circuitry. Each of the subsystems that is monitored has a communication device installed thereon that can report the existence and status.

A communication device that can be used for reporting purposes is an I-button device. The I-button device is usually interfaced to a subsystem of an electronic system and its output is connected via a one-wire bus through which the I-button receives queries from a monitoring circuit and reports the status of the subsystem to which it is interfaced. Also, the I-button is powered from the one wire bus. Thus for an electrical system comprising a plurality of subsystems an I-bus system can be built where a plurality of I-button device are connected to the one-wire bus and upon query from a remote processor, report their information to the processor. An I-button typically contains communication circuitry, microprocessor circuitry and memory circuits. The memory circuits are used to store reporting data describing the status of a subsystem and identification data used to identify the particular subsystem whose information is being reported by the I-button. A protocol has been developed that dictates how a plurality of I-button devices connected to a one-wire bus is to transmit information onto the bus; this protocol will hereinafter be referred to as the one wire bus I-button protocol. The I-button devices do not initiate the communication; they respond to the queries of a monitoring processor or circuit that is also connected to the one wire bus. The processor transmits queries for specific I-button devices onto the bus. The queries are transmitted as per the one wire bus I-button protocol. Each query specifies an I-button from which information is requested. The I-buttons not only use the one-wire bus to respond to queries from a monitoring processor but the I-buttons also are powered via the bus. In sum, each I-button device is able to receive queries (in the form of digital communication signals) from a processor or circuit connected to the one wire bus and each I-button receives its power from the one wire bus.

Referring to FIG. 1 there is shown a one wire bus system to which are connected various I-buttons (110, 112, 114) that report the status of their associated subsystems (116, 118, 120). The subsystems are part of an electronic system whose status is monitored by a processor (not shown) residing on transceiver circuit 102. Although not shown the subsystems are interconnected to form an electrical system remotely located from transceiver 102. In addition to a processor transceiver circuit 102 contains transmitter circuits and receiver circuits and other supporting circuitry that allow the processor to comply with the one wire bus I-button protocol. Transceiver 102 transmits queries onto one wire bus 106 specified for a particular I-button residing on a particular subsystem. The queried I-button responds to the query reporting the existence and status of the system on which it is currently residing. The I-buttons on each of the subsystems are electrically connected to these subsystems which many times contain stray capacitances and have noise that ultimately leaks onto the one wire bus. One of the reasons for such stray or leakage capacitance and noise is that the transceiver system, the subsystems and the I-buttons all use the same ground reference level 108. Thus a common path for circuit components on the subsystems, the I-buttons and the transceiver allows noise to leak through to the bus. Moreover each of the I-buttons uses capacitance as a means to store the internal voltage to the I-Button thereby storing information. Although these capacitances are diode isolated from the one wire bus, a relatively small portion of this capacitance is seen on the bus. The aggregate capacitance from the subsystems and the I-buttons adversely affects the communication signals on the bus. The communication signals are signals that switch from logic high (i.e., 5 volts) to logic low (i.e., 0 volt).

The subsystems and other circuitry proximately located to the one-wire bus generate noisy signals that affect the ability of transceiver 102 to accurately detect the switching 1's and 0's representing the communication signals on bus 106. Typically a low threshold and a high threshold is established which define a "1" or a "0" signal on the bus. Assuming the lowest voltage for a signal is 0 volt and the highest voltage is 5 volts a high threshold level is usually set a few tenths of a volt under 5 volts and the low threshold is usually set a few tenths of a volt above 0 volt. For example the high threshold can be 4.3 volts and the low threshold can be 0.7 volt. As a result a communication signal (usually digital signals) above 4.3 volts will be deemed to be a logic or digital "1" (i.e., a "high") and a signal less than 0.7 volt will be deemed to be a logic or digital "0" (i.e., a "low"). However, many times for many semiconductor technologies the voltage at which a signal is defined as a "0" or a "1" is halfway between 0 volt and the high voltage—usually 5 volts. For example, for CMOS (Complementary Metal Oxide Semiconductor) technology a signal above 2.5 volts is a digital "1" and a signal below 2.5 volts is a digital "0". When there is noise on the bus, a 2.5 volt noise signal can be erroneously interpreted as a "1" when in fact there is no signal on the bus or the actual signal is less than 0.7 volt. Also because of the extra capacitances on the one wire bus a "high" signal may take a relatively long time to ramp up to the "high" level. To resolve the capacitance problem an IBAP (I-Button Active Pull-up) device 104 is used to help pull the "high" voltages (i.e., ramp up faster) in spite of the extra capacitances.

Referring to FIG. 2 there is shown a portion of FIG. 1 depicting in detail the IBAP device 104. IBAP 104 comprises Voltage Sense Switch (VSS) device coupled to a first impedance $Z_1$ and a second impedance $Z_2$ where $Z_2 << Z_1$. For example $Z_1$ may equal 1KΩ (1000 ohms in resistance)

and $Z_2$ may equal 100Ω. The VSS device, which can be implemented with a p-channel FET (Field Effect Transistor) senses the voltage on bus 106 and when the voltage is approaching a high threshold, say 4 volts, VSS switches from $Z_1$ to $Z_2$. The aggregate capacitance as seen by the bus is referred to as C. The total impedance provided by either pull-up impedance $Z_1$ or $Z_2$ is referred to as R. Thus there is an equivalent RC circuit connected to the bus resulting in a particular RC time constant. The IBAP device, and in particular, the VSS portion of the device is connected to circuit ground which represents reference point from which all voltage levels are based. Connection point 107—the reference connection point—of the IBAP device is typically connected to circuit ground. Because $Z_2 \ll Z_1$ the RC time constant becomes much less and the signal transitioning to a high voltage is better able to reach the 5 volts or a voltage above the high threshold typically set at or about 4.3 volts. In other words when the VSS senses a signal transitioning towards the high threshold it switches from a 1k pull-up to a 100 ohm pull-up reducing the RC time constant allowing the transitioning voltage to reach its high voltage quicker. Thus, IBAP device 104 is able to significantly reduce the adverse effects of the extra capacitance seen by the one wire bus 106. IBAP device 104 is typically implemented as an integrated circuit such as the MAX6314US26D1 manufactured by Maxim Inc. Even though the active pull-up device significantly reduces the adverse effects of the extra capacitance problem on the one wire bus, the communication signals are still within a noisy environment and therefore data transmitted onto the bus can still be erroneously interpreted by communication devices (I-buttons, transceiver) connected to the bus. What is therefore needed is a method and/or circuit that eliminates or significantly reduces the adverse effects of the noise on a one wire-bus to which a plurality of I-buttons and at least one active pull-up device is connected.

SUMMARY OF THE INVENTION

The present invention provides a circuit that significantly reduces the adverse effects of noise and capacitance on a one-wire bus to which a plurality of I-button devices is connected. The circuit comprises an active pull-up device coupled to a level shift circuit. The level shift circuit is connected to circuit ground and thus replaces ground as the reference level for the active pull-up device. In effect the active pull-up device operates with reference to a voltage level provided by the level shift circuit. The voltage level is a certain voltage above or below the circuit ground level thus enabling the active pull-up device to operate with reference to a voltage different from circuit ground. Preferably, the voltage level is set above circuit ground. As a result, the circuit operates above at least a portion of the noisy signals on the one-wire bus allowing digital signals on the bus to have a bias signal equal to the reference voltage signal. Communication devices connected to the bus are thus better able to determine the digital logic levels of the digital communication signals.

DETAILED DESCRIPTION

The present invention provides a circuit that significantly reduces the adverse effects of noise and capacitance on a one-wire bus to which a plurality of I-button devices is connected. The circuit comprises an active pull-up device coupled to a level shift circuit. The level shift circuit is connected to circuit ground and thus replaces ground as the reference level for the active pull-up device. In effect the active pull-up device operates with reference to a voltage level provided by the level shift circuit. The voltage level is a certain voltage above or below the circuit ground level thus enabling the active pull-up device to operate with reference to a voltage different from circuit ground. Preferably, the voltage level is set above circuit ground. As a result, the circuit operates above at least a portion of the noisy signals on the one-wire bus allowing digital signals on the bus to have a bias signal equal to the reference voltage signal. Communication devices connected to the bus are thus better able to determine the digital logic levels of the digital communication signals.

Figure 1:
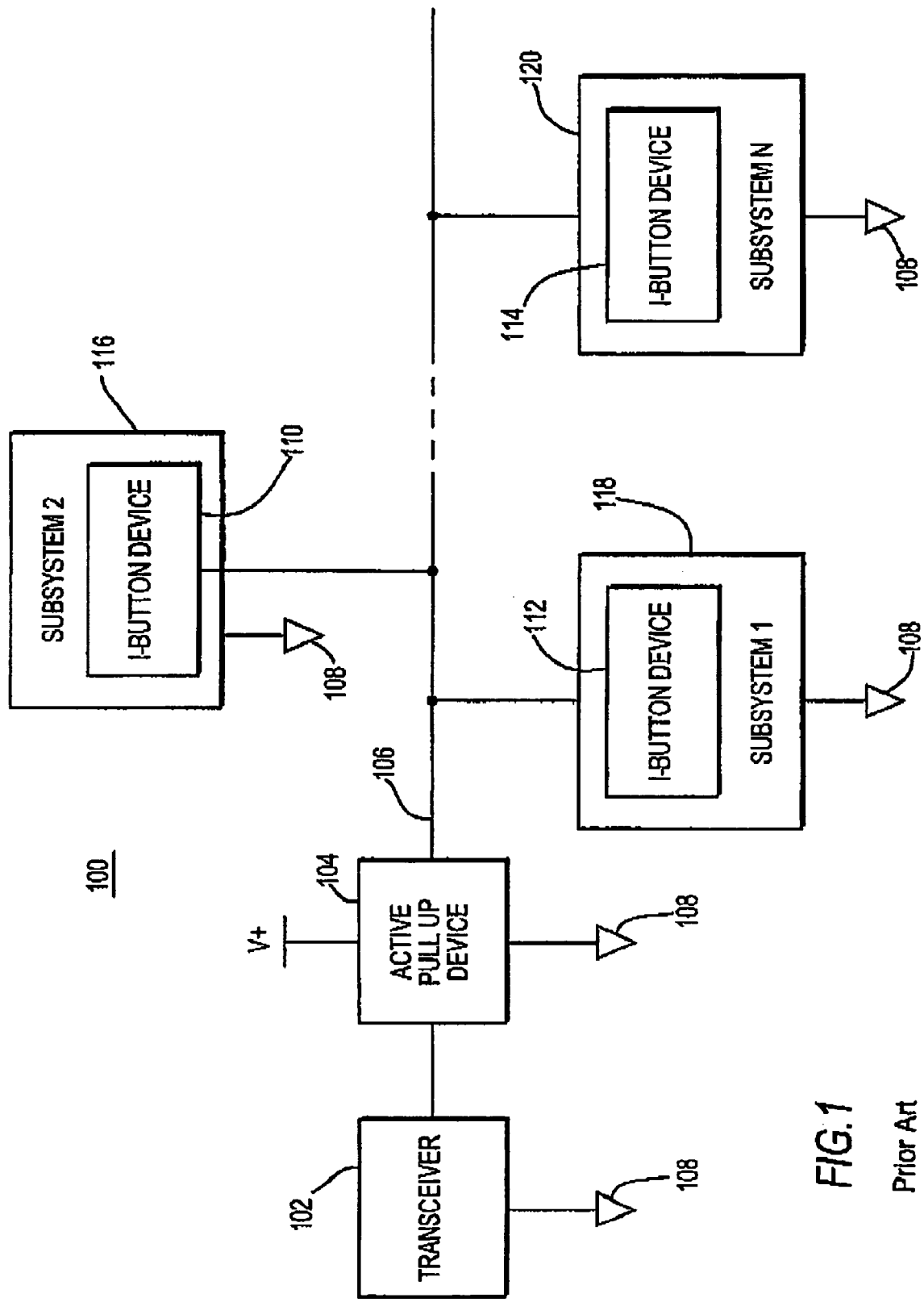
FIG. 1 is a monitoring system using I-buttons as reporting devices reporting on the status of electrical subsystems using a one wire bus.
Figure 2:
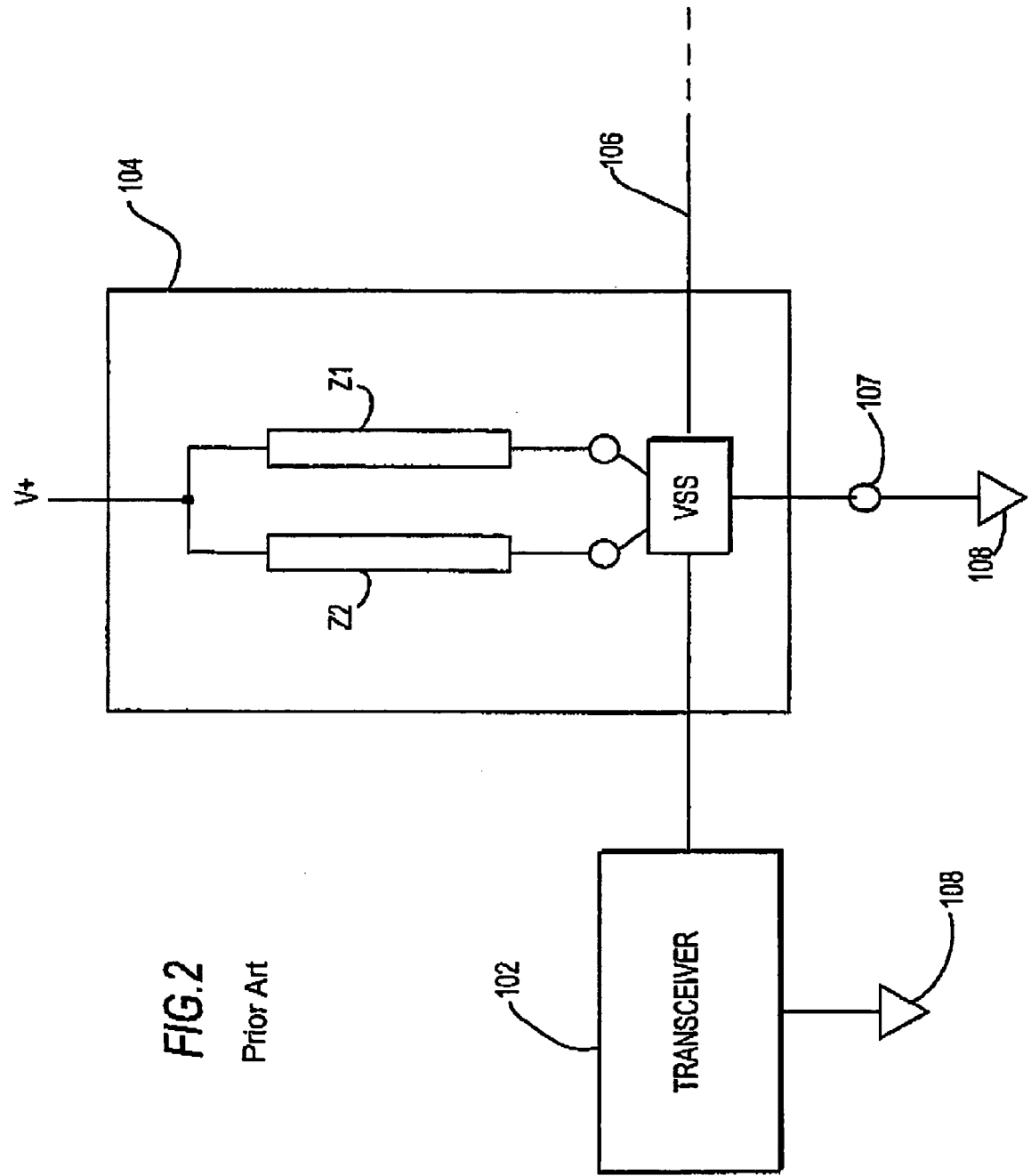
FIG. 2 shows a detailed portion of an I-button active pull-up device.
Figure 4:
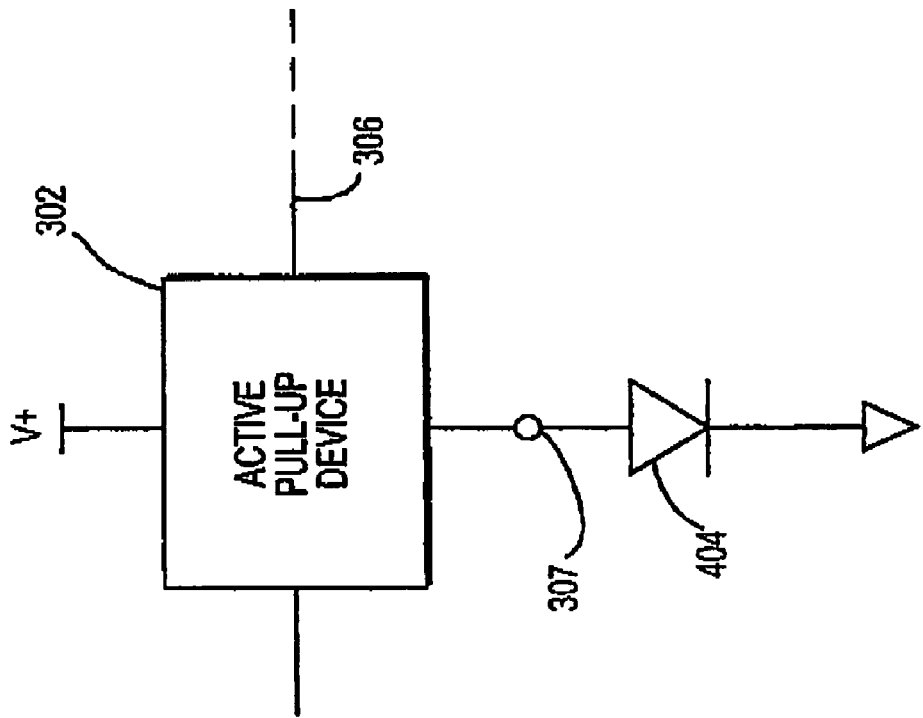
FIG. 4 shows a particular implementation of the present invention.
Figure 3:
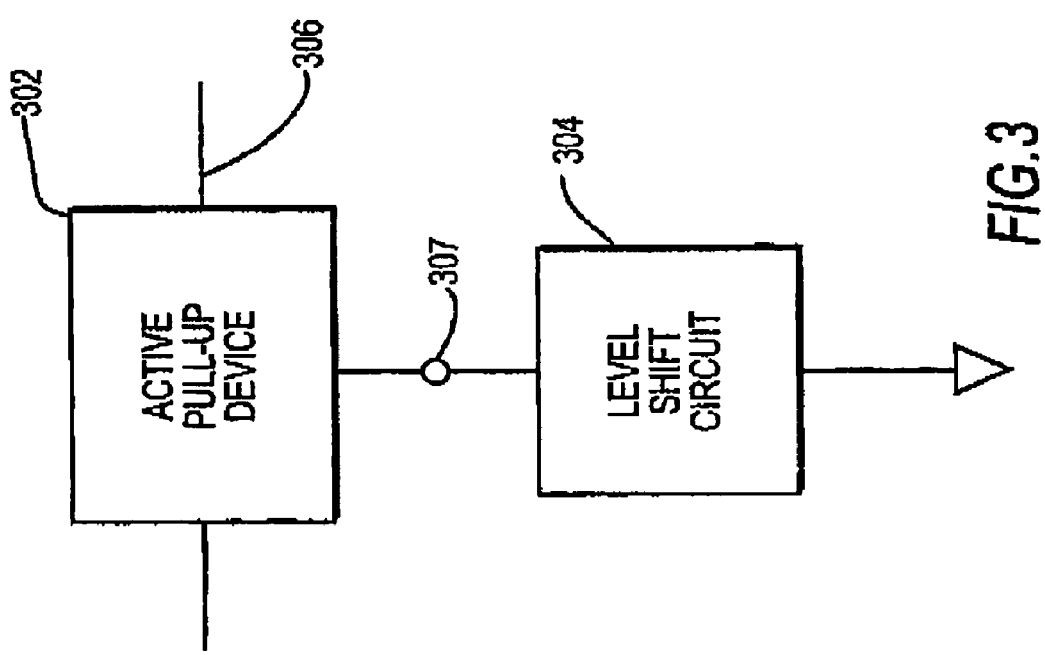
FIG. 3 shows the circuit of the present invention.

Referring to FIG. 3 there is shown the circuit of the present invention comprising an active pull-up device 302 coupled to a level shift circuit 304 which is connected to circuit ground. Level shift circuit 304 is connected to the reference connection point 307 of active pull-up device 302. The circuit is coupled to a one-wire bus 306 to which a plurality of I-button devices (not shown) is connected. The I-button devices can be part of various components or subsystems of an electrical system that is being monitored by a processor or processing circuit also connected to bus 306. The level shift circuit provides a reference voltage to active pull-up device 302. The reference voltage is different from circuit ground and preferably several tenths of a volt above circuit ground level. Thus, the active pull-up device 302 operates with reference to the reference voltage provided by level shift circuit 304 instead of circuit ground. As a result, the noise on the one wire data bus has a less adverse effect on the circuit's ability to detect the digital signals appearing on the one wire bus. I-button devices or a transceiver or processor that queries the I-button devices connected to the bus are better able to detect logic digital signals (i.e., "1" and/or "0"). In effect the circuit of the present invention operates a few tenths of a volt above the circuit ground level. One particular implementation of the level shift circuit 304 is the use of a diode (e.g., diode with forward bias voltage of 0.5 volts). Referring to FIG. 4 diode 404 is connected to active pull-up device 302. The cathode of diode 404 is connected to circuit ground and the anode of diode 404 is connected to the reference voltage connection point 307 of active pull-up device 302. The voltage at the reference connection point 307 thus is a certain voltage above circuit ground which voltage is equal to the forward bias voltage of diode 404. Other well known level shift circuits can be used to provide the reference voltage level to active pull-up circuit 302.

We claim:

1. A circuit comprising:
    an active pull-up device coupled to a one-wire bus, wherein the active pull-up device is configured to decrease the transition time of a voltage signal on the one-wire bus transitioning from a first voltage level to a second, higher voltage level; and a level shift circuit coupled to the active pull-up device to circuit ground, said level shift circuit providing a substantially constant reference voltage level different than said circuit ground, wherein the active pull-up device is configured to operate with respect to the constant reference voltage level for decreasing the transition time of said voltage signal.

2. The circuit of claim 1 wherein the one-wire bus is a hi-directional one-wire bus for hi-directional communications, and the active pull-up device switches from a first impedance to a second, lower impedance when the voltage signal rises above a designated threshold voltage level between the first and second voltage levels, for decreasing said transition time of the voltage signal due to parasitic capacitances on the one-wire bus.

3. The circuit of claim 2 wherein:
the voltage signal on the one-wire bus includes a bias signal equal to the reference voltage level; and
the active pull-up device has a voltage sense switch that is coupled to the level shift circuit, said active pull-up device being configured to initiate the decrease of said transition time when the voltage sense switch determines that a measured level of the voltage signal has risen above the designated threshold voltage level, said voltage signal being measured with respect to said reference voltage level.

4. The circuit of claim 2 where the level shift circuit is a diode with its cathode connected to circuit ground and its anode connected to a reference connection point of the active pull-up device.

5. The circuit of claim 2 further comprising:
at least one communication device coupled to the one-wire bus and configured to output said voltage signal for communicating over the one-wire bus, wherein the at least one communication device is configured to include a bias signal equal to the reference voltage level in the voltage signal.

6. The circuit of claim 5 further comprising:
a transceiver having a processor, wherein the transceiver is coupled to the one wire bus and is configured to communicate with said at least one communication device over said one-wire bus, wherein communication signals generated by the transceiver are biased by said reference voltage level.

7. A circuit comprising:
a level shift circuit connected to a circuit ground and configured to output a substantially constant reference voltage level different than said circuit ground; and
an active pull-up device coupled to the level shift circuit and to a one-wire bus for bi-directional communications wherein the active pull-up device is configured to output a first designated voltage level on the one-wire bus when a measured voltage level of a communication signal on the bus rises above a second designated voltage level, said second voltage level being less than the first voltage level said active pull-up device measuring the voltage level of the communication signal with respect to the constant reference voltage; and wherein the active pull-up device decreases a transition time of the communication signal on the one-wire bus transitioning from the second voltage level to the first voltage level.

8. The circuit of claim 7 wherein:
the active pull-up device switches from a first impedance to a second, lower impedance when the measured voltage level of the communication signal on the bus rises above the second designated voltage level, for decreasing said transition time of the communication signal; and
the communication signal includes a bias signal equal to the reference voltage level.

9. The circuit of claim 8 wherein the level shift circuit is a diode with its cathode connected to circuit ground and its anode connected to a reference connection point of the active pull-up device.

10. The circuit of claim 7 further comprising:
at least one communication device coupled to the one-wire bus and configured to output said voltage signal for communicating over the one-wire bus, wherein the at least one communication device is configured to include a bias signal equal to the reference voltage level in the voltage signal.

11. The circuit of claim 10 further comprising:
a transceiver having a processor, wherein the transceiver is coupled to the one wire bus and is configured to communicate with said at least one communication device over said one-wire bus, wherein communication signals generated by the transceiver are biased by said reference voltage level.

12. A communication system comprising:
a one-wire bus for bi-directional communications:
a transceiver connected to the one-wire bus;
a communication device connected to the one wire-bus, wherein the communication device is configured to apply a voltage signal to the bus for communicating with the transceiver;
an active pull-up device connected to the one-wire bus and configured decrease the transition time of the voltage signal on the one-wire bus when transitioning from a first voltage level to a second, higher voltage level, when the voltage signal passes above a threshold level; and
a level shift circuit disposed between the active pull-up device and a circuit ground, said level shift circuit providing a substantially constant reference voltage level above or below said circuit ground, wherein the active pull-up device is configured to operate with respect to the constant reference voltage level, and wherein the voltage signal applied by the communication device includes a bias voltage equal to said constant reference voltage level.

* * * * *